June 22, 1965
F. SOLARI
3,190,020
SYSTEM FOR PROVIDING LINES AND BOARDS OF INFORMATION
SHOWING SYMBOLS FOR THE PURPOSE OF EXHIBITING
INDICATIONS OF VARIOUS TYPES
Filed Nov. 20, 1961
6 Sheets-Sheet 1
Fig.1
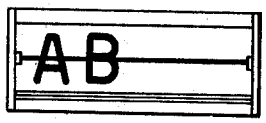
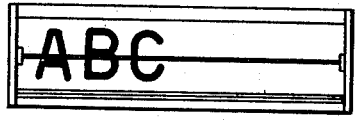
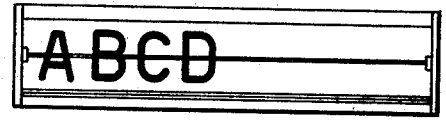
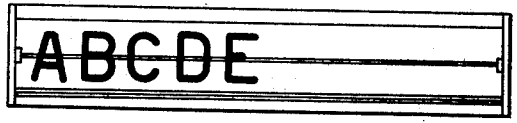
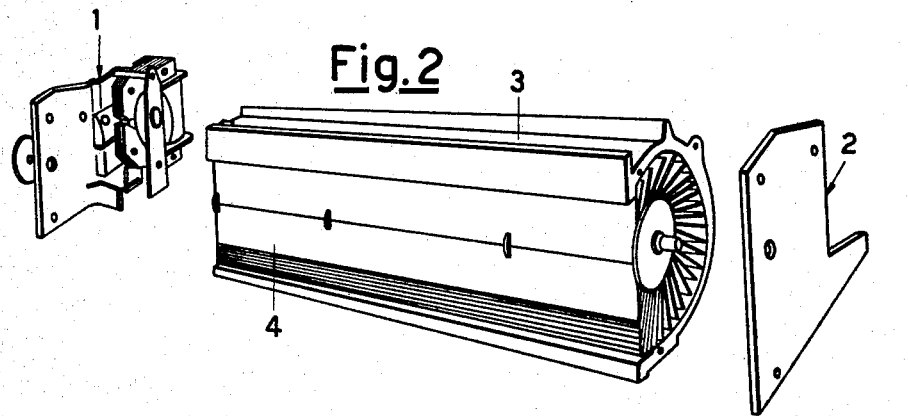
INVENTOR
Fermo Solari
BY
Stevens, Davis, Miller + Mosher
ATTORNEYS June 22, 1965  F. SOLARI  3,190,020
SYSTEM FOR PROVIDING LINES AND BOARDS OF INFORMATION
SHOWING SYMBOLS FOR THE PURPOSE OF EXHIBITING
INDICATIONS OF VARIOUS TYPES
Filed Nov. 20, 1961  6 Sheets-Sheet 2
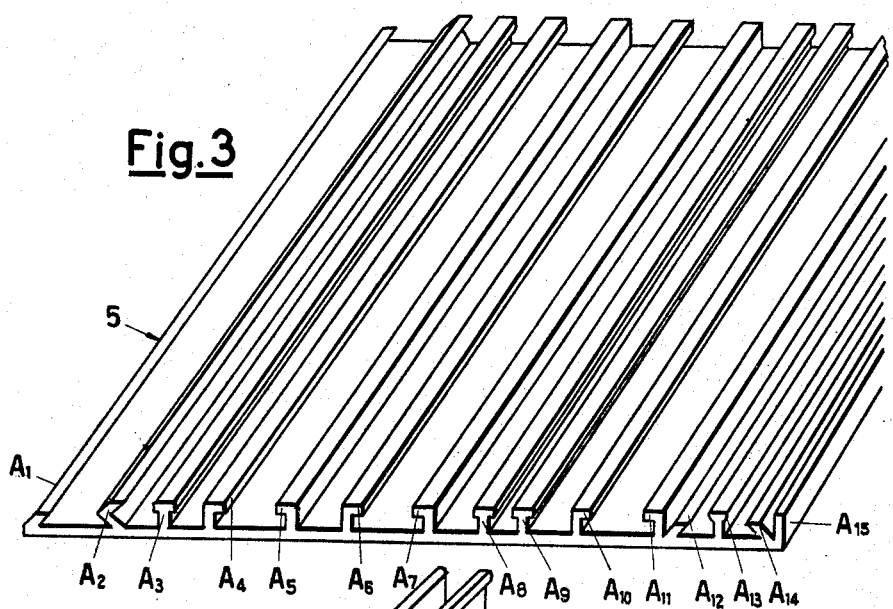
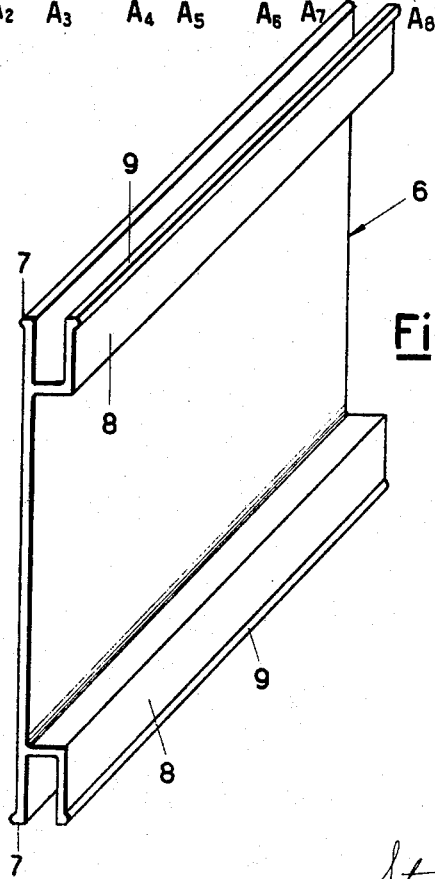
INVENTOR
Fermo Solari
BY
Stevens, Davis, Miller - Mosher
ATTORNEYS

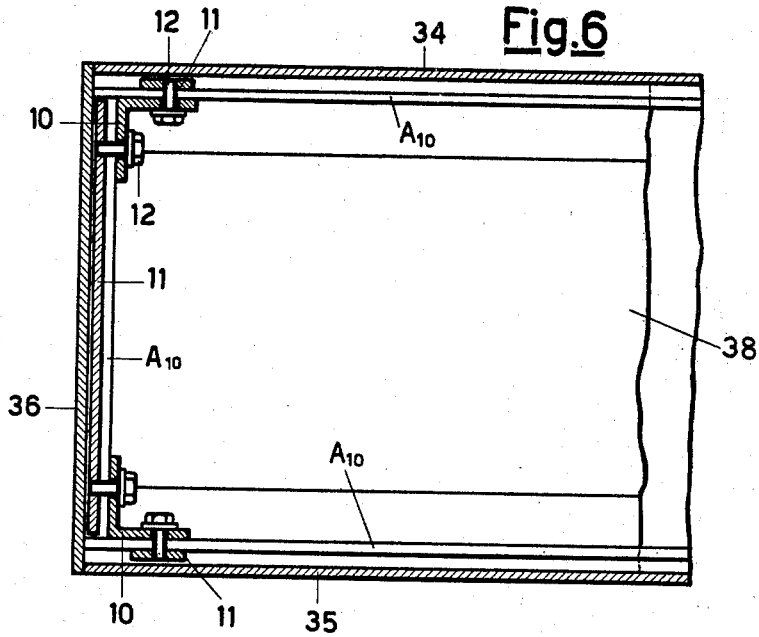
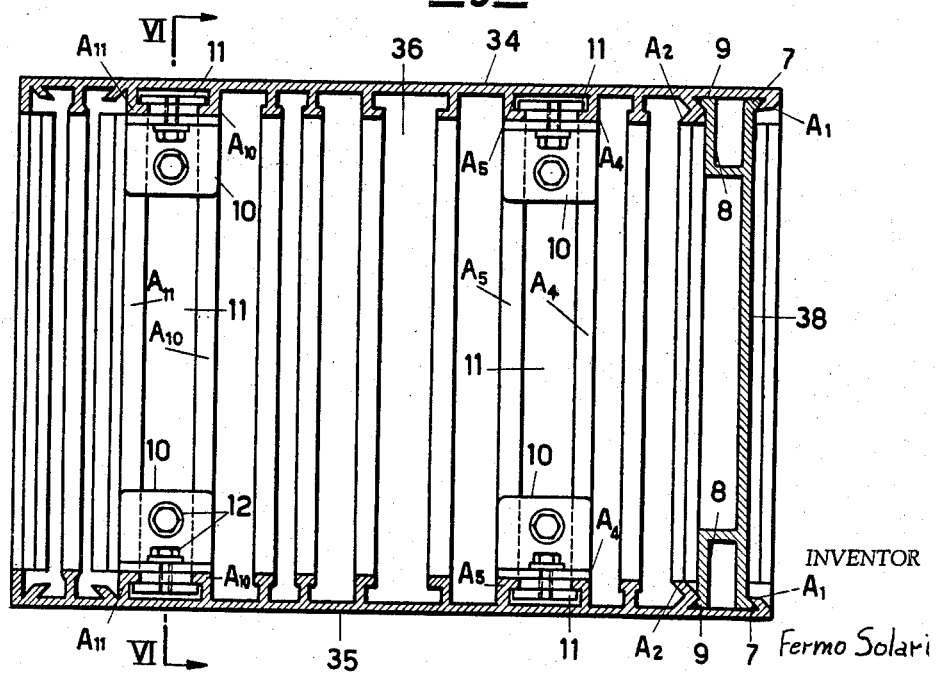

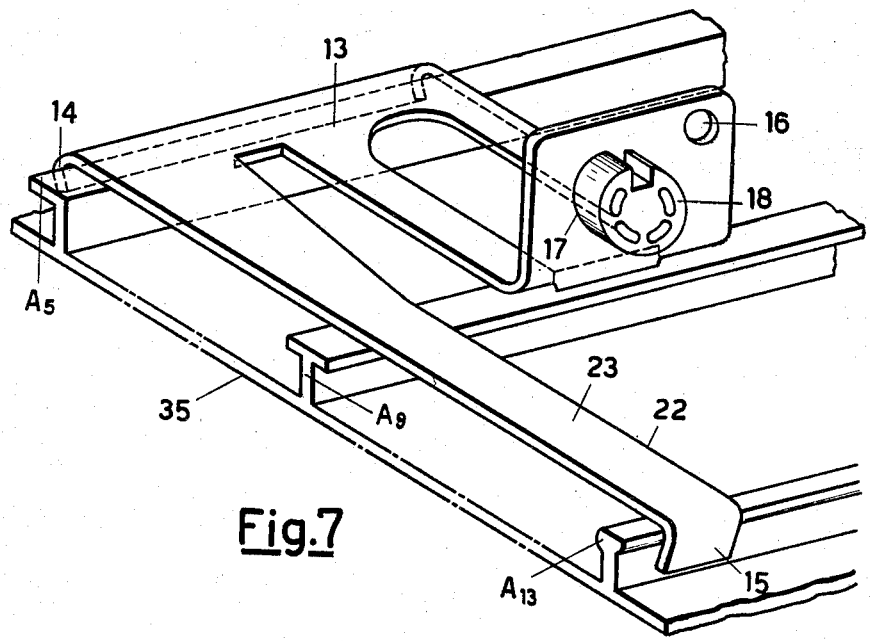
Fig.7
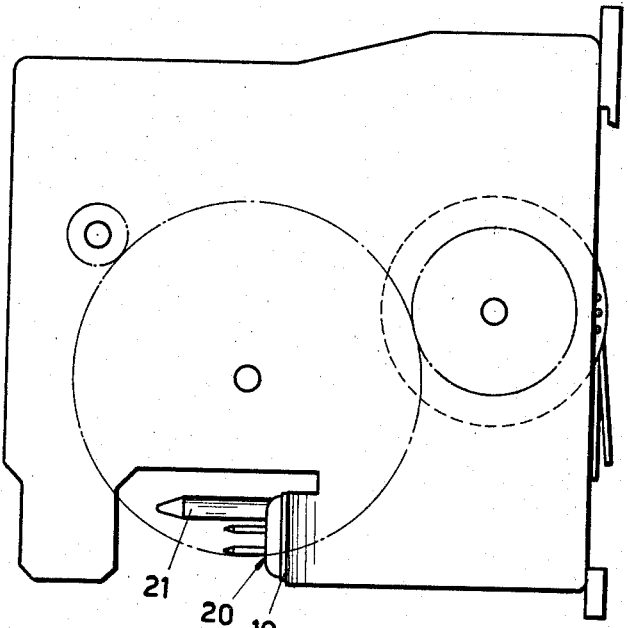
Fig.8
Fig.9

June 22, 1965 F. SOLARI 3,190,020
SYSTEM FOR PROVIDING LINES AND BOARDS OF INFORMATION
SHOWING SYMBOLS FOR THE PURPOSE OF EXHIBITING
INDICATIONS OF VARIOUS TYPES
Filed Nov. 20, 1961 6 Sheets-Sheet 5
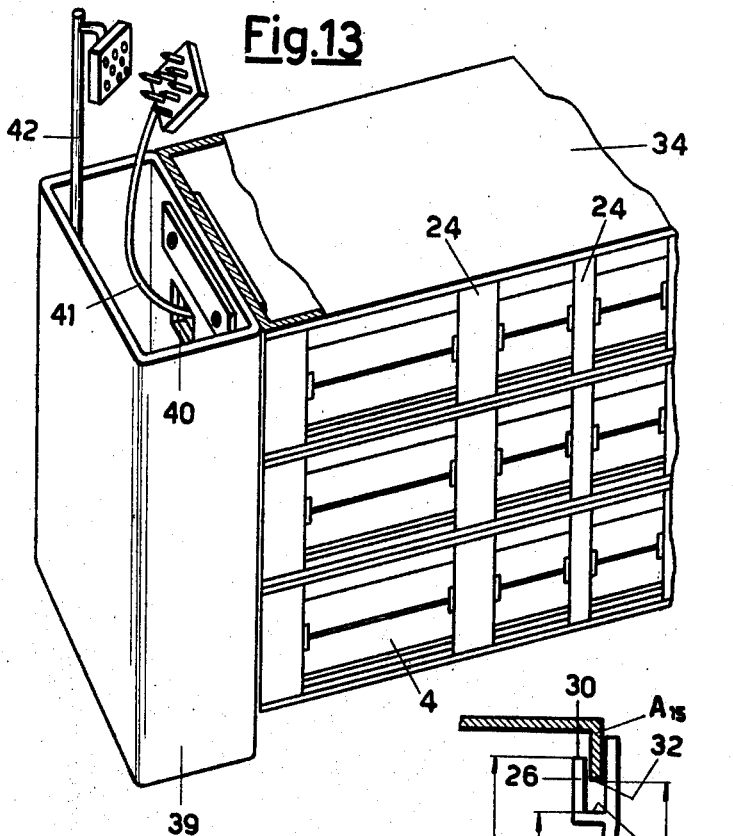
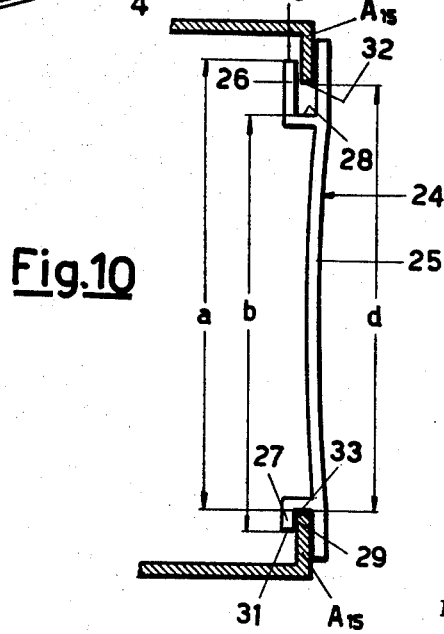
INVENTOR
Fermo Solari
BY Stevens, Davis, Miller & Mosher
ATTORNEYS June 22, 1965 F. SOLARI 3,190,020
SYSTEM FOR PROVIDING LINES AND BOARDS OF INFORMATION
SHOWING SYMBOLS FOR THE PURPOSE OF EXHIBITING
INDICATIONS OF VARIOUS TYPES
Filed Nov. 20, 1961 6 Sheets-Sheet 6
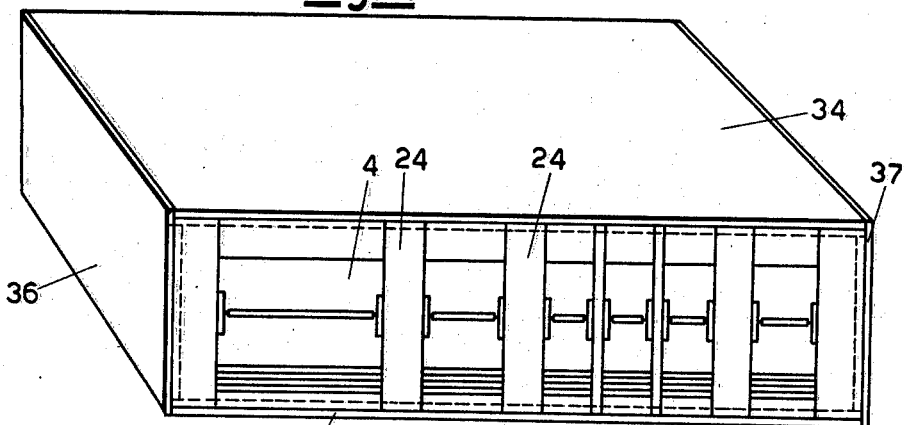
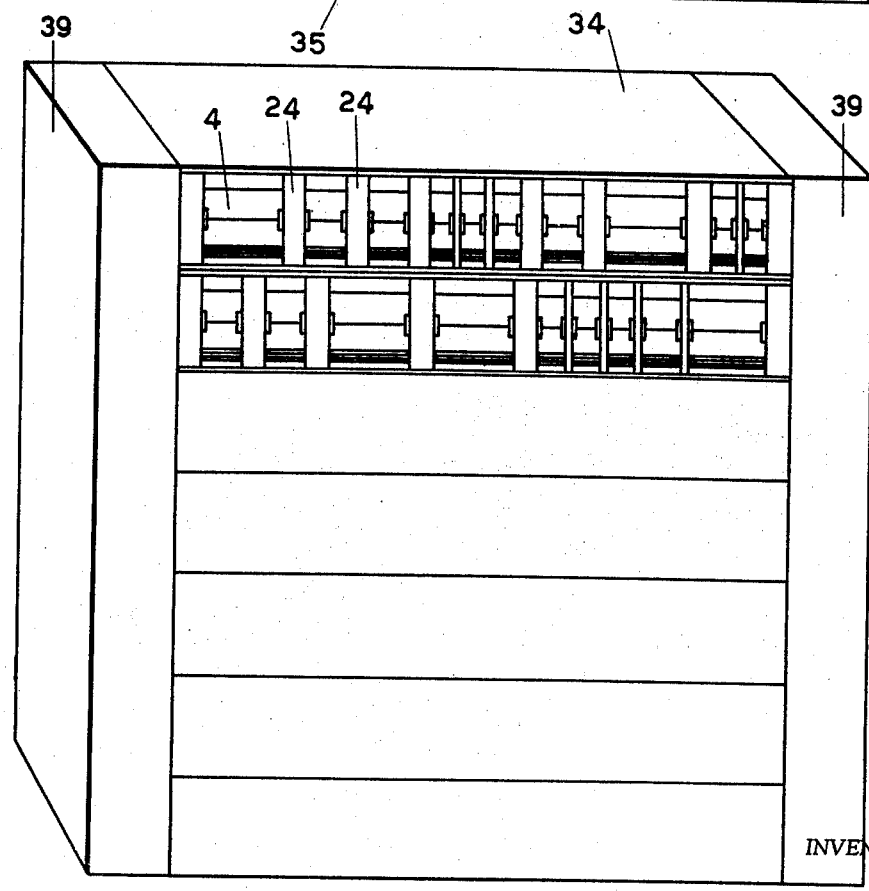
INVENTOR
Fermo Solari
BY
Stevens, Davis, Miller & Mosher
ATTORNEYS United States Patent Office 3,190,020
Patented June 22, 1965

3,190,020
SYSTEM FOR PROVIDING LINES AND BOARDS OF INFORMATION SHOWING SYMBOLS FOR THE PURPOSE OF EXHIBITING INDICATIONS OF VARIOUS TYPES
Fermo Solari, Udine, Italy, assignor to Solari & C./Udine S.p.A., Udine, Italy, an Italian company
Filed Nov. 20, 1961, Ser. No. 153,416
Claims priority, application Italy, Sept. 14, 1961, Patent 655,632
4 Claims. (Cl. 40—83)

The present invention relates to a system for providing lines and boards of information, in which each line comprises elements showing symbols for the purpose of providing information of various types, e.g. arrivals and departures of trains, aircraft and other means of transport, stock market quotations, meter readings, etc.

As will appear from the following description, the elements showing said symbols, making up the lines and boards of information by means of the system in question, can with advantage be blade wheels in which each blade carries at least one symbol on one face thereof; wheels of this kind form part of remote-control indicators patented by the same applicant.

The system according to the present invention is characterized in that each line comprises a box with one of its walls missing, which box is adapted to contain said elements, the parts whereof, showing said symbols, appear in view at the front of said box, the sides of the box being provided with parts, which can be of the same material as said sides, which can be used for fastening together said sides, for fastening to the box, in adjustable positions inside same, devices functioning as spacers of said elements, and for fastening on said front of the box the sides adapted to form closing walls for the compartments which are formed between said elements and between the two extreme elements and the adjacent lateral walls.

To explain more fully the characteristics and advantages of the system according to the present invention, we shall now describe an embodiment exemplifying lines and boards of information according to the invention, with reference to the accompanying drawing in which:

FIG. 1 shows some blade wheels in a front view;
FIG. 2 shows a perspective view of the various parts of a type of blade wheel;
FIGURES 3 and 4 show perspective views of two walls which can be formed from two distinct sections;
FIG. 5 shows a cross-section along a vertical plane of the box of one line (without the blade wheels);
FIG. 6 shows the cross-section along the line VI—VI of FIG. 5;
FIGURES 7 and 8 show respectively a right-angle bracket and a blade wheel, seen from one side;
FIG. 9 shows a detail of FIG. 8, viewed from an angle of 90° in respect to said FIG. 8;
FIG. 10 shows a detail of a spacing element;
FIGURES 11 and 12 show respectively a line and a board of lines;
FIG. 13 shows a detail of said board.

To make up the lines and boards, it is better to use the blade wheels which will be described shortly hereinafter, but it should be understood that the employment of said blade wheels, even though preferable, does not limit the invention; the system according to the invention can be provided with other types of rollers or other means.

The essential parts of each wheel, as described in U.S. patent application Serial No. 49,604 filed August 15, 1960, of the same applicant, comprise two side members 1 and 2 and a box 3 containing the blades 4 of the wheel. Said side members together with the part mounted on side member 1, which comprises a conventional electro-mechanical advancement and control mechanism, are the same for all blade wheels; box 3 housing the several wheels can be different from one wheel to another as regards length only, according to the lengths of the blades themselves: box 3 can in practice be cut out of a single section by cutting off said section in various lengths.

The wheels of one set (FIG. 1) are of such lengths as to indicate, according to need, either a single symbol such as a letter of the alphabet, a numeral, a punctuation mark, etc., or two symbols such as the monograms of airline companies, train designations and the like, or numerals consisting of two digits, such as times (e.g. 06, 08, 12, 15, 22), or finally to indicate names of towns, trade names of airline companies, indications for passages, exits, delays and so forth.

The lengths of the wheels of a set, whereof some examples are given in FIG. 1 are not determined casually but on the basis of a functional criterion, in particular, the unit or basic length may be selected as that of the shortest wheel, called modulus wheel 1 in this text, which, as remarked herein before, is suitable for the inscription thereon of a single symbol, according to this criterion (which is not limiting) the lengths of the other wheels would be multiples of said unit wheel, so that we should have, for example modulus 2, 3, 4, 5, 6 etc. wheels.

An ordered complex of wheels of suitable moduli, placed inside a single box or compartment, permits a single piece of information on a given topic to be furnished; this complex, consisting of the wheels plus the box, will be called the line in the following description.

An assembly of several lines constitutes a board which can, at one and the same time, provide a plurality of items of information relating to a given topic.

*Example.*—A board indicating the departures and arrivals of aircraft at an airport, in which each line can, for example, be composed of wheels indicating in order: the destination of the aircraft; the route which it will take to arrive at said destination; the company operating the flight; the flight number; the hour of departure; the minutes past the hour of departure; any delays in the departure time; the channel for going to the aircraft; and, in order to show these indications, wheels of modulus 1 or greater are used.

It is also possible to form lines and hence boards showing the departures of trains.

Each line can be composed of, for example, a set of wheels showing: destination, type of train, hour of departure; minutes past the hour of departure; track (or platform) number; delay, alternatively, stock market quotations can be shown, and so on.

A detailed description will now be given of said embodiment of the system for providing each line and hence the entire board of lines, according to the invention.

The box for containing the wheels of a line can be formed from two types only of sections, distinct one from the other; one of them is indicated by the numeral 5 and is obtained by extrusion and comprises a set of shaped ribs A*i* (in the present invention *i*=1, 2 . . . 15); the other section, indicated by the numeral 6, can also be obtained by extrusion and comprises a flat end wall at each opposed side, with two thickened edges 7.

Near edges 7 there are provided respectively two right-angle parts 8, each of which terminates in a thickened edge 9; the distance between edges 9 is equal to the distance between said edges 7.

By cutting said section 5 into pieces, four walls of the box are obtained, each pair consisting of two equal members, whilst by cutting section 6, a fifth wall is provided.

The walls that can be derived from section 5 are the top and bottom 34 and 35, and the two sides 36, 37; whilst from section 6 the back 38 is derived.

Some small metal brackets 10 (all the same) and small metal plates 11 (also all the same), together with some screws 12, are provided for fitting the box together. For the assembly of each wheel in the box, there is provided a right-angle bracket indicated by the numeral 13: the latter comprises two curved-round edges 14 and 15 designed to be hooked on to respective ribs $A_5$ and $A_{13}$, and comprises also a hole 16, and a hole 17 housing the female part 18 of a multi-pole plug whereof more will be said hereinafter.

A part 19 of side wall 1 of the wheel is bent in a right angle to the side wall itself, towards the inside; said part 19 carries the male part 20 of said multi-pole plug and a pin 21 of the same diameter as that of hole 16. Part 20 and pin 21 are adapted to be inserted respectively into said female part 18 and into said hole 16; the reciprocal positions of holes 16 and 17 and the reciprocal positions of pin 21 and part 20 are such that they naturally allow this coupling to be made, and the fit 16–21 has the function of guiding fit 18–20.

Edge 22 of strip 23 of bracket 13 is in such a position, in relation to the axes of holes 16 and 17, that it guides the wheel when same is inserted into the box. Bracket 13 can be obtained by casting, or by shearing and bending a metal plate.

A set of spacers is also provided, each one of which (indicated by the numeral 24) comprises a slightly curved side 25 and two right-angle parts 26 and 27; for reasons which more clearly appear in the description of the assembly of the line if $a$ be the distance between edge 30 and plane 29, $b$ the distance between plane 28 and edge 31, $d$ the distance between the two edges 32 and 33 of ribs $A_{15}$ on the top and bottom, then $a>d$ and $b<d$. We shall now describe the assembly of each line and then of a whole board of lines.

In assembling the box, black 38, the length of which is equal to that of top 34 and bottom 35, is fastened to said top and bottom, without welding or fastening means such as screws and the like: each side of the back, comprising a pair of edges 7 and 9, is forced between the two ribs $A_1$ and $A_2$ of the top and bottom respectively, this being possible because the material is yielding to a certain extent, thereafter the elastic reaction of the material locks said edges 7 and 9 between said ribs.

Each of the two side walls 36 and 37 is fastened to top 34 and bottom 35 by means of a few brackets 10 with plates 11 and screws 12: in making said fastening, the two right-angle walls of each bracket are fastened, with said screws, to two respective plates 11 pushed between the corresponding ribs of a top or bottom piece and one side; the pair of ribs to be used can be pairs $A_4$–$A_5$, $A_6$–$A_7$, or $A_{10}$–$A_{11}$.

When the box consisting of said walls 34 to 38, has been assembled, the several wheels designed to form one line, are inserted therein; the moduli of said wheels can be equal or different one from another according to the indication that the line has to give.

For mounting the wheels in the box, the latter is provided with as many brackets 13 as there are wheels; the several brackets 13 are arranged in positions corresponding to the positions which the wheels must occupy in said box when the line is complete.

Each bracket 13 is hooked with its bent-round edges 14 and 15 on the respective ribs $A_5$ and $A_{13}$; since the material of the brackets is elastically yielding, it is possible, by means of said hooking, to obtain a secure locking of the bracket so that same will not only not become disengaged from said ribs, but cannot even slide longitudinally thereto. This is of cardinal importance in that the position of the bracket determines the position of the wheel. The wheel can be guided into the box by sliding it with side 1 in contact with edge 22. When the wheel is pushed into the box, pin 21 and male part 20 of the multi-pole plug penetrate respectively into hole 16 and part 18 of the plug itself. Pin 21, in cooperation with hole 16, serves as a guide for the wheel so as more easily to introduce part 20 of the plug into its respective part 18 and make a good mechanical fit between the wheel and bracket 13.

In this manner all the wheels are arranged in the desired positions, which are established according to the functions and the aesthetic appearance that are required of the line.

The several female parts 18 of the plugs are electrically connected each with a respective lead feeding the wheel, and these leads are brought together into one cable corresponding to the line; the several line cables 41, i.e. all the line cables making up an entire board, are connected together into a general cable 42.

When the several wheels have been put in position, there will be a clearance between one wheel, and the next, i.e. when looking at the box from the front, there will be visible as many spaces as there are wheels, plus one extra (taking into account the end walls 36 and 37, i.e. the spaces between the end wheels and the end walls).

In order to protect the inside of the line and for the sake of good appearance, but above all in order to stop the wheel from coming out of the line box, said spaces are closed at the front by as many side members consisting of said spacers 24.

In order to insert the corresponding spacer between any two wheels, part 26 must be pushed behind the top rib $A_{15}$, and the spacer lifted until plane 28 meets edge 32 so that edge 31 can overlap edge 33 and hence push the spacer down. The spacer can only come out of its lodgement if the reverse movements are made to those described, since $a>d$.

Wall 25 is made curved as stated in order to prevent any play of the spacer in its lodgement.

In fact when part 26 is pushed behind top rib $A_{15}$ and plane 28 is brought up against edge 32 so as to bring edge 31 towards the inside of the box beyond edge 33, a certain inwardly directed pressure must be exerted on the lower part of wall 25 since said wall, because of its inwardly convex shape, meets two edges of two side members 1 and 2 of the two wheels under consideration. Since the material of said wall 25 is elastically yielding, said wall yields at first under said pressure, thus allowing edge 31 to overlap edge 33; the spacer is then pushed downwards until plane 29 meets edge 33, after which the elastic reaction of wall 25 keeps the spacer locked without any play of any kind.

A plurality of lines can be provided with the same means hereinabove described and in the same manner.

A board of information, for example the arrivals and departures of trains or any other type of information, consists of an assemblage of lines.

The board can be provided by fastening the various lines, i.e. the boxes of the various lines, to two side supports consisting of two uprights 39. Said supports, which are the same as each other, can be formed essentially of tubular members of rectangular section with the front wall removable for the insertion inside the section, of the line and general cables; in the wall of each support facing the lines there is provided a set of holes 40, one for each line; through said holes 40 pass the respective line cables 41 which are connected to the general cable 42 which is in turn connected to the central control panel.

Amongst the various advantages of the system hereinabove disclosed, we may note in particular the constructional simplicity of the several parts making up the lines and boards, and the simplicity of assembly of the lines and boards.

Another notable advantage lies in the fact that the arrangement of the wheels in any line can be altered; in particular, a multiple wheel can be replaced by one or more unitary wheels; thus a wheel of modulus $n$ can be replaced by $n$ wheels of modulus 1. When the wheels are changed about in this manner, it is sufficient to replace the line cable with a line cable suitable for the new arrangement of the wheels.

It is manifest that all the parts, such as guides, spacers, wheels, etc. can always be used even when modified, and can easily be replaced.

I claim:

1. In a cabinet construction, top, bottom and side walls, each wall having interiorly a plurality of spaced parallel ribs, connecting means extending between a set of ribs of one wall to a corresponding set of ribs in an adjacent wall to maintain said walls in substantially perpendicular relationship with each other, and back wall means extending between two of said walls, said back wall means including spaced parallel edges resiliently engaging another set of ribs in the rear edges of said two of said walls.

2. In a cabinet construction according to claim 1, in which spacer means are disposed between the top and bottom walls of the open front to divide the cabinet into compartments, said spacer means formed from yielding material and being curved with its convexity facing toward the inside of the cabinet, the ends of said spacer means engaging said top and bottom walls having fork portions which communicate with an outer rib of the top and bottom walls.

3. In a cabinet construction according to claim 1, in which said connecting means include plate means disposed between a set of ribs, a bracket member having a portion engaging the tops of said set of ribs adjacent one plate means and another portion engaging the tops of a corresponding set of ribs adjacent another plate means, and securing means extending between each portion and its adjacent plate means to secure said walls together.

4. In a cabinet construction according to claim 1, in which a right-angled bracket means is mounted on said bottom wall, said bracket means having hook portions engaging ribs towards the front and rear of said bottom wall, female electric plug member carried by said bracket means, said female electric plug member being connected to an electric power supply means, and electrically operable variable indication means connected to a male electric plug member, said indication means being enabled by connection of said plug members to display information through the front of said cabinet.

References Cited by the Examiner
UNITED STATES PATENTS

| | | | |
|---|---|---|---|
| 372,972 | 11/87 | Flick | 312—230 |
| 389,765 | 9/88 | Settle | 312—234 |
| 482,722 | 9/92 | Cook | 40—68 X |
| 2,019,706 | 11/35 | Hungerford | 160—235 |
| 2,112,498 | 3/38 | Lax | 312—263 X |
| 2,190,426 | 2/40 | Hutchinson | 40—84 |
| 2,332,766 | 10/43 | Von Gehr | 339—9 X |
| 2,384,355 | 9/45 | Torrence | 312—223 X |
| 2,884,296 | 4/59 | Meilinger et al. | 312—263 |

FOREIGN PATENTS 824,596  11/37  France.

JEROME SCHNALL, *Primary Examiner.*

LEWIS J. LENNY, *Examiner.*